(12) United States Patent
Sakakibara et al.

(10) Patent No.: US 10,630,098 B2
(45) Date of Patent: Apr. 21, 2020

(54) CHARGING CONTROL DEVICE

(71) Applicant: Honda Motor Co., Ltd., Tokyo (JP)

(72) Inventors: Naoya Sakakibara, Saitama (JP); Jun Kudo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 15/975,780

(22) Filed: May 10, 2018

(65) Prior Publication Data

US 2018/0358837 A1 Dec. 13, 2018

(30) Foreign Application Priority Data

Jun. 12, 2017 (JP) ................................ 2017-115415

(51) Int. Cl.
*H02J 7/04* (2006.01)
*H02J 7/02* (2016.01)
*B60L 53/20* (2019.01)
*H02J 7/00* (2006.01)
*B60L 53/62* (2019.01)
*B60L 53/63* (2019.01)

(52) U.S. Cl.
CPC .............. *H02J 7/045* (2013.01); *B60L 53/20* (2019.02); *B60L 53/62* (2019.02); *B60L 53/63* (2019.02); *H02J 7/0029* (2013.01); *H02J 7/022* (2013.01); *H02J 7/027* (2013.01); *B60L 2210/30* (2013.01); *B60L 2240/529* (2013.01); *B60L 2260/50* (2013.01); *H02J 7/00302* (2020.01); *H02J 7/00304* (2020.01); *H02J 7/00306* (2020.01)

(58) Field of Classification Search
CPC ...................................... H02J 7/00; H02J 7/02
See application file for complete search history.

(56) References Cited

U.S. PATENT DOCUMENTS

| 2006/0017444 A1* | 1/2006 | Fechalos | G01R 31/389 324/433 |
| 2013/0082662 A1* | 4/2013 | Carre | H02J 7/0052 320/134 |

FOREIGN PATENT DOCUMENTS

| JP | 2003-092829 | 3/2003 |
| JP | 2012-210131 | 10/2012 |
| JP | 5417280 | 2/2014 |

OTHER PUBLICATIONS

"Office Action of Japan Counterpart Application," dated Aug. 21, 2018,with English translation thereof, p. 1-p. 8.

* cited by examiner

*Primary Examiner* — Robert Grant
(74) *Attorney, Agent, or Firm* — JCIPRNET (57) ABSTRACT

A charging control device includes a charging current control unit which sets a target value (Isp) of a charging current from an external power supply to a high-voltage battery, a charging current adjusting circuit which adjusts the charging current to the Isp, a supply voltage sensor which detects a supply voltage from the external power supply to the high-voltage battery, and a supply voltage monitoring unit which detects or predicts presence or absence of a decrease in the supply voltage from a predetermined normal charging voltage using an output of the supply voltage sensor, where when the decrease is not detected or predicted, the Isp is set to a predetermined normal target value, and when the decrease is detected or predicted, the Isp is changed to be equal to or lower than the normal target value and maintained at a value at which the supply voltage reaches a determination voltage.

4 Claims, 5 Drawing Sheets

CHARGING CONTROL DEVICE

CROSS-REFERENCE TO RELATED APPLICATION

This application claims the priority benefit of Japan application serial no. 2017-115415, filed on Jun. 12, 2017. The entirety of the above-mentioned patent application is hereby incorporated by reference herein and made a part of this specification.

BACKGROUND

Technical Field

The disclosure relates to a charging control device which controls charging of a storage battery.

Description of Related Art

A charging control device has been proposed that reduces the influence on a power system when a load on a charging power source becomes concentrated, as in a case in which charging is simultaneously started for a plurality of storage batteries of electric vehicles or the like (for example, see Japanese Patent No. 5417280 (Patent Document 1)). In the charging control device of Patent Document 1, while supplying a charging current from a charging power supply to a storage battery via a load limiting element such as resistor, an amount of voltage drop in the load limiting element is monitored, and the charging current to the storage battery is controlled based on the amount of voltage drop.

In the technology of Patent Document 1, the charging current is controlled by opening/closing a bypass circuit of the load limiting element or changing a resistance value of the load limiting element itself based on the amount of voltage drop in the load limiting element. Thereby, even when a voltage drop of the charging power supply is large, a surrounding voltage can be maintained at a certain level or higher even when charging electric vehicles at the same time by employing a charging mode in which charging of the storage battery is continued for a long time with a small charging current.

However, in the technology of Patent Document 1, when a voltage of the charging power supply continues to decrease and then drops to an alternating current (AC) constant voltage determination threshold value, the charging is stopped and a state in which charging cannot be continued is reached. Once such a state is reached and an operation for resuming the charging is repeated so that interruption of charging is frequently performed, usability may be deteriorated.

The disclosure provides a charging control device capable of minimizing repetition of interruption of charging even when a charging power supply is unstable and a voltage of the charging power supply has decreased.

SUMMARY

According to one or more embodiments of the disclosure, a charging control device (for example, a charging control device 1 to be described below) controls charging of a storage battery (for example, high-voltage battery 2 to be described below) with an external power supply (for example, an external power supply 10 to be described below), and includes a target value setting portion (for example, a charging current control unit 604 to be described below) which sets a target value (Isp) of a charging current from the external power supply to the storage battery, a charging current adjusting portion (for example, a driving circuit 208 and a charging current adjusting circuit 207) which adjusts the charging current to the set target value, a supply voltage detecting portion (for example, a supply voltage sensor 205 to be described below) which detects a supply voltage from the external power supply to the storage battery, and a voltage monitoring portion (for example, supply voltage monitoring unit 601) which detects or predicts presence or absence of a decrease in the supply voltage from a predetermined normal charging voltage (VDH) using an output of the supply voltage detecting portion, in which the target value setting portion sets the target value to a predetermined normal target value (Imax) when the decrease in the supply voltage is not detected or predicted by the voltage monitoring portion, and changes the target value to be equal to or lower than the normal target value and maintains the target value at a value (Ilim) at which the supply voltage reaches a determination voltage (VDL) lower than the normal charging voltage when the decrease in the supply voltage is detected or predicted by the voltage monitoring portion.

According to one or more embodiments of the disclosure, when the voltage monitoring portion detects that the supply voltage has decreased to the determination voltage or lower, detects a rapid decrease in the supply voltage, or predicts that the supply voltage will rapidly decrease from the normal charging voltage, the target value setting portion decreases the target value to a predetermined lower limit value (Imin), gradually increases the target value from the lower limit value until the supply voltage reaches the determination voltage, and maintains the target value at a value (Ilim) at which the supply voltage reaches the determination voltage.

According to one or more embodiments of the disclosure, when the voltage monitoring portion detects that the supply voltage has decreased to a level equal to or lower than a charging stop voltage (Vth) which is lower than the determination voltage, the target value setting portion continues to set the target value to zero until the supply voltage reaches the normal charging voltage, gradually increases the target value from zero, and maintains the target value at a value (Ilim) at which the supply voltage reaches the determination voltage.

DESCRIPTION OF THE EMBODIMENTS (1) In the disclosure, the supply voltage detecting portion detects a supply voltage from the external power supply to the storage battery, and the voltage monitoring portion detects or predicts presence or absence of a decrease in the supply voltage from a normal charging voltage using an output of the supply voltage detecting portion during charging. The target value setting portion sets a target value for the charging current to a predetermined normal target value when the decrease in the supply voltage is not detected or predicted, and the charging current adjusting portion adjusts the charging current to the set target value. Also, when the decrease in the supply voltage is detected or predicted, the target value setting portion changes the target value of the charging current to be equal to or lower than the normal target value, and then maintains the target value at a value at which the supply voltage reaches a determination voltage lower than the normal charging voltage. Then, the charging current adjusting portion adjusts the charging current in accordance with the change of the target value as described above. That is, in the charging control device of the disclosure, when the external power supply is unstable for certain reasons during charging and the supply voltage decreases from the normal charging voltage, a charging current is decreased to become lower than the normal target value so that the supply voltage is maintained at the determination voltage which is lower than the normal charging voltage. Therefore, according to the charging control device of the disclosure, even when the external power supply is unstable and the supply voltage decreases from the normal charging voltage, it is possible to continue the charging by decreasing the charging current to an appropriate level according to a state of the external power supply. Also, when the charging current is decreased to an appropriate level as described above, it is possible to avoid frequent repetition of interruption of charging even when the external power supply is unstable.

(2) In the disclosure, when it is detected that the supply voltage has decreased to the determination voltage or lower, when a rapid decrease in the supply voltage is detected, or when it is predicted that the supply voltage will rapidly decrease from the normal charging voltage, the target value setting portion decreases the target value to a predetermined lower limit value, gradually increases the target value from the lower limit value until the supply voltage reaches the determination voltage, and then maintains the target value at a value at which the supply voltage reaches the determination voltage. Therefore, according to the charging control device of the disclosure, even when an external power supply is in an unstable state, it is possible to set the maximum possible target value within a range in which supply is possible.

(3) In the disclosure, when it is detected that the supply voltage has decreased to a level equal to or lower than the charging stop voltage which is lower than the determination voltage, the target value setting portion continues to set the target value to zero until the supply voltage reaches the normal charging voltage. That is, the target value is set to zero, and charging is temporarily stopped. Thereafter, the target value setting portion gradually increases the target value from zero and then maintains the target value at a value at which the supply voltage reaches the determination voltage. Therefore, according to the charging control device of the disclosure, after a temporary stop of the charging in accordance with the external power supply being brought into a charging disabled state, the charging can be resumed by decreasing the charging current to an appropriate level in accordance with the state of the external power supply. In addition, by resuming charging by decreasing the charging current to an appropriate level in accordance with the state of the external power supply as described above, when the unstable state of the external power supply continues even thereafter, since the supply voltage can be prevented from decreasing to the charging stop voltage or lower, frequent repetition of interruption of charging can be avoided. Further, according to the charging control device of the disclosure, even when the external power supply is in an unstable state, it is possible to set the maximum possible target value within a range in which supply is possible.

Figure 1:
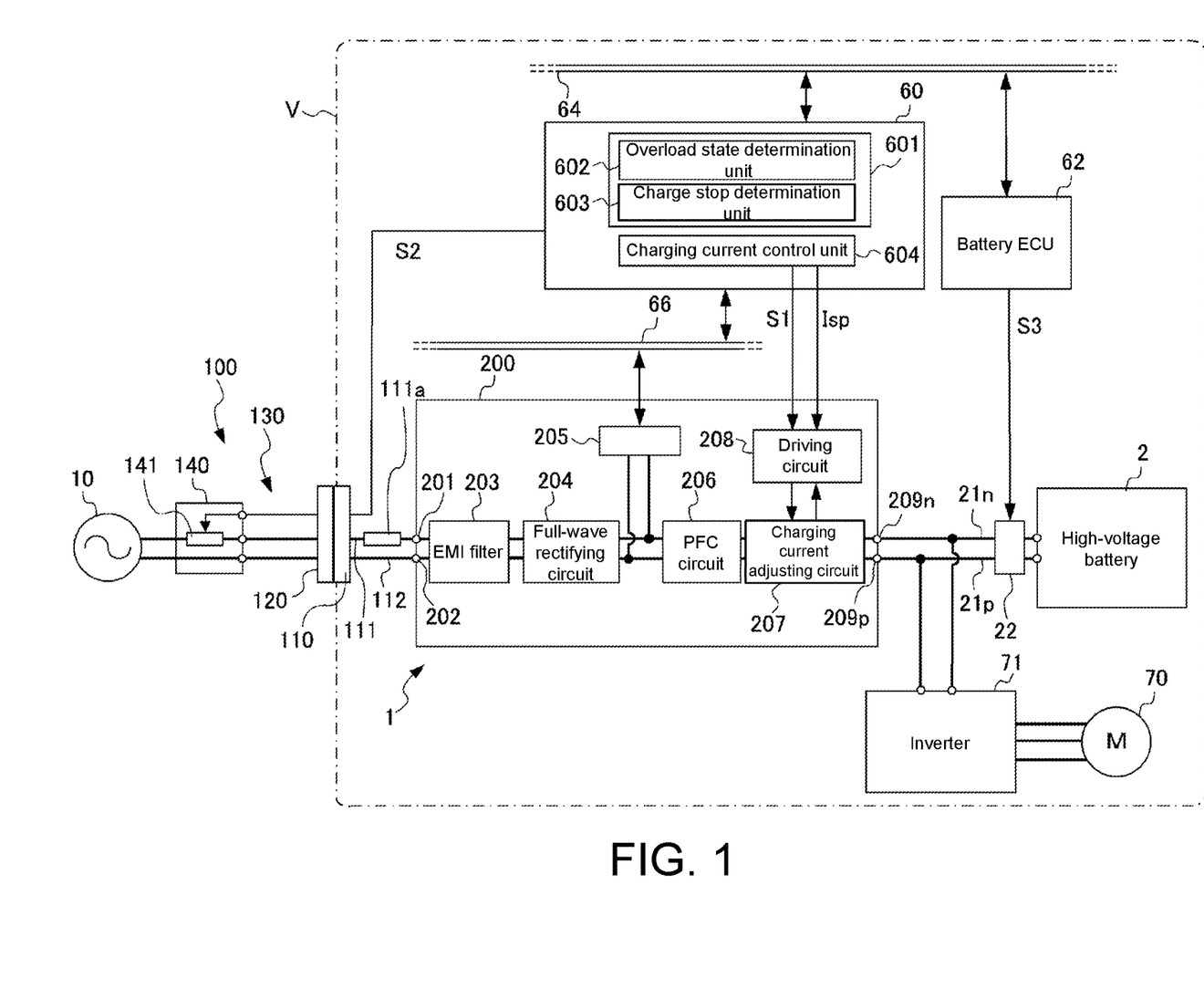
FIG. 1 is a view illustrating a configuration of a charging control device according to one embodiment of the disclosure and an electric vehicle on which the charging control device is mounted.

Hereinafter, a charging control device according to one embodiment of the disclosure will be described with reference to the drawings. FIG. 1 is a view illustrating a configuration of a charging control device 1 according to one embodiment of the disclosure and an electric vehicle V (hereinafter simply referred to as a "vehicle V") on which the charging control device 1 is mounted. The charging control device 1 controls, for example, charging from an external power supply 10 which is commercial alternating current (AC) power supply for home use to a high-voltage battery 2 serving as a storage battery mounted on the vehicle V.

The external power supply 10 and the vehicle V are connected via electric vehicle supply equipment (EVSE) 100. The EVSE 100 includes a charging cable 130 as a major constituent having a plug (not illustrated) connected to the external power supply 10 at one end and a charging plug 120 connected to an inlet 110 on the vehicle V side at the other end. A charging circuit interrupt device (CCID) 140 is provided in the charging cable 130.

The CCID 140 includes a CCID relay 141 which connects or disconnects a charging path of the charging cable 130 in accordance with a charging request signal S2 transmitted from a charging electronic control unit (ECU) 60 to be described below. When the charging request signal S2 is ON, the CCID relay 141 closes and connects the charging path. Also, when the charging request signal S2 is OFF, the CCID relay 141 opens and disconnects the charging path. Further, the charging ECU 60 sets the charging request signal S2 to ON during charging, and sets the charging request signal S2 to OFF when an overvoltage is detected during the charging.

The vehicle V includes a running motor 70 mechanically connected to driving wheels (not illustrated), an inverter 71 connected to the running motor 70, the high-voltage battery 2 serving as a power supply source of the running motor 70 and the inverter 71, the charging control device 1 for controlling charging of the high-voltage battery 2, and a positive side power line 21p and a negative side power line 21n (hereinafter collectively referred to as "power lines 21p and 21n") for connecting the high-voltage battery 2 to the charging control device 1.

The high-voltage battery 2 is a secondary battery capable of both discharging in which chemical energy is converted into electric energy and charging in which electric energy is converted into chemical energy. In the following description, as the high-voltage battery 2, a so-called lithium-ion battery which performs charging and discharging by moving lithium ions between electrodes will be described, but the disclosure is not limited thereto.

The running motor 70 may be, for example, a three-phase AC motor. When power is supplied from the high-voltage battery 2 via the inverter 71, the running motor 70 generates a driving force. In addition, the running motor 70 generates power by performing a regenerative operation. The power generated by the regenerative operation of the running motor 70 is supplied to the high-voltage battery 2 via the inverter 71 to charge it.

The inverter 71 is connected to the power lines 21p and 21n of the high-voltage battery 2, converts a direct current (DC) supplied from the high-voltage battery 2 via the power lines 21p and 21n into three-phase AC, and supplies the AC to the running motor 70. Further, during the regenerative operation of the running motor 70, AC supplied from the running motor 70 is converted into DC and supplied to the high-voltage battery 2.

A main contactor 22 which connects and disconnects the power lines 21p and 21n is provided on the high-voltage battery 2 side of the power lines 21p and 21n extending from the high-voltage battery 2 to the charging control device 1 with respect to a portion to which the inverter 71 is connected.

The main contactor 22 is of a normally-open type which is open in a state in which no command signal from the outside is input. The main contactor 22 is closed according to a command signal S3 from a battery ECU 62. More specifically, for example, when charging/discharging is performed between the high-voltage battery 2 and the inverter 71 during running of the vehicle V, when power from the charging control device 1 is supplied to the high-voltage battery 2 to charge the high-voltage battery 2, or the like, the main contactor 22 is closed in accordance with the command signal S3 transmitted from the battery ECU 62.

The charging control device 1 includes an on-board charger 200 which converts AC power from the external power supply 10 into DC power, the charging ECU 60 serving as an electronic control unit for controlling the on-board charger 200, the battery ECU 62 serving as an electronic control unit for monitoring a state of the high-voltage battery 2, and controller area network (CAN) buses 64 and 66 which are bus type networks exchanging various types of control information between the on-board charger 200, the charging ECU 60, and the battery ECU 62.

One power line 111 of two AC power lines connected to the inlet 110 of the vehicle V is connected to one input terminal 201 of the on-board charger 200 via a fuse 111a, and the other power line 112 is directly connected to the other input terminal 202 of the on-board charger 200. Also, the two power lines 21p and 21n connected to the high-voltage battery 2 are respectively connected to the positive output terminal 209p and the negative output terminal 209n of the on-board charger 200.

The on-board charger 200 includes an electromagnetic interference (EMI) filter 203, a full-wave rectifying circuit 204, a supply voltage sensor 205, a power factor correction (PFC) circuit 206, a charging current adjusting circuit 207, and a driving circuit 208 of a charging current adjusting circuit 207.

The EMI filter 203 is connected to the input terminals 201 and 202. The EMI filter 203 removes noise included in an AC output of the external power supply 10 which is input via the input terminals 201 and 202. The full-wave rectifying circuit 204 is, for example, a bridge circuit using four diodes, and outputs a positive absolute voltage from the AC output that has passed through the EMI filter 203.

The PFC circuit 206 is a power factor correction circuit for bringing a power factor of the power supply close to 1. For this PFC circuit 206, for example, an interleave-type boost converter configured using a combination of a two-phase boost converter and a smoothing capacitor may be employed. An output of the PFC circuit 206 is supplied to an input side of a charging current adjusting circuit 207.

The supply voltage sensor 205 is provided between the full-wave rectifying circuit 204 and the PFC circuit 206. The supply voltage sensor 205 detects an effective value of an AC voltage of the external power supply 10 supplied to the PFC circuit 206 via the full-wave rectifying circuit 204, and transmits a signal corresponding to the detected value to the charging ECU 60 via the CAN bus 66. In the following description, the effective value of the AC voltage detected by the supply voltage sensor 205 is also referred to as a supply voltage Vrms from the external power supply 10 to the high-voltage battery 2.

The charging current adjusting circuit 207 is provided between the PFC circuit 206 and the output terminals 209p and 209n and is a circuit for adjusting a DC charging current supplied to the high-voltage battery 2 via the output terminals 209p and 209n. For example, a DC/DC converter configured using a combination of a plurality of switching elements which are turned on/off according to a pulse width modulation (PWM) signal from a driving circuit 208, a transformer, and the like may be employed as the charging current adjusting circuit 207.

As will be described below in detail, when charging the high-voltage battery 2 using the on-board charger 200, the charging ECU 60 transmits a charging on/off control signal S1 which instructs ON/OFF of charging by the on-board charger 200 and a target value setting signal Isp having a level corresponding to a target value for the charging current to the driving circuit 208. When the control signal S1 is ON, by using the target value setting signal Isp transmitted from the charging ECU 60 and a feedback signal transmitted from the charging current adjusting circuit 207, the driving circuit 208 inputs a PWM signal whose duty ratio has been adjusted to the charging current adjusting circuit 207 so that a charging current having a level corresponding to the target value setting signal Isp is output from the output terminals 209p and 209n. Thereby, a charging current having the level according to the target value setting signal Isp is supplied to the high-voltage battery 2. Also, when the control signal S1 is set to OFF, the driving circuit 208 stops the transmission of the PWM signal to the charging current adjusting circuit 207. As a result, the charging current to the high-voltage battery 2 becomes zero, and the charging is temporarily stopped.

The charging ECU 60 and the battery ECU 62 are microcomputers configured using hardware such as an input/output (I/O) interface for performing analog/digital (A/D) conversion on detection signals of sensors of various types, a random-access memory (RAM) or read-only memory (ROM) for storing programs and data of various types, a central processing unit (CPU) for executing various types of arithmetic processing in accordance with the above-described programs, and a driving circuit for generating control signals of various types according to the arithmetic processing results of the CPU.

The battery ECU 62 is a microcomputer responsible for controlling on/off of the main contactor 22, monitoring of a state of the high-voltage battery 2, and the like. A battery sensor (not illustrated) for detecting a voltage of the high-voltage battery 2, an output current or charging current of the high-voltage battery 2, and a temperature of the high-voltage battery 2 is connected to the battery ECU 62, and a charging ratio of the high-voltage battery 2 (a ratio of a remaining capacity of the battery to a fully charged capacity in a percentage, hereinafter referred to as "SOC (State Of Charge)") is calculated by using the detection signal of the battery sensor. The SOC of the high-voltage battery 2 calculated by the battery ECU 62 is appropriately transmitted to the charging ECU 60 via the CAN bus 64.

The charging ECU 60 is a microcomputer responsible for controlling charging of the high-voltage battery 2 using the on-board charger 200. The charging ECU 60 includes a supply voltage monitoring unit 601 for monitoring the supply voltage Vrms during charging and a charging current control unit 604 for controlling a charging current during charging. The supply voltage monitoring unit 601 and the charging current control unit 604 are control modules realized by the above-described hardware. Hereinafter, functions of the supply voltage monitoring unit 601 and the charging current control unit 604 will be sequentially described.

First, as described above, for the external power supply 10, for example, commercial AC power supply for home use may be used. Therefore, the supply voltage Vrms during charging of the high-voltage battery 2 is not always constant near a predetermined normal charging voltage VDH and may decrease due to various circumstances in some cases. Specifically, for example, when a large facility such as a factory is connected to the external power supply 10 in addition to the vehicle V, the supply voltage Vrms may rapidly decrease depending on an operating state of the large facility. In addition, for example, when a resistance of a power supply wiring from the external power supply 10 to the inlet 110 is high, the supply voltage Vrms may gradually decrease with a temperature rise of the power supply wiring. Therefore, the supply voltage monitoring unit 601 detects or predicts presence or absence of a decrease in the supply voltage Vrms from the normal charging voltage VDH during charging and updates an overload state flag and a charging stop request flag to ON or OFF in accordance with the detection result. More specifically, the supply voltage monitoring unit 601 includes an overload state determination unit 602 for updating a value of the overload state flag to one or zero in accordance with the supply voltage Vrms, and a charge stop determination unit 603 for updating the charging stop request flag to ON or OFF in accordance with the supply voltage Vrms.

The overload state determination unit 602 sets the overload state flag to OFF immediately after a start of charging of the high-voltage battery 2. During the charging of the high-voltage battery 2, when it is detected that the supply voltage Vrms has decreased from the vicinity of the normal charging voltage VDH to a level equal to or lower than a load decrease determination voltage VDL set to be lower than the normal charging voltage VDH, when it is detected that the supply voltage Vrms has rapidly decreased from the normal charging voltage VDH, or when it is predicted that the supply voltage Vrms will rapidly decrease from the normal charging voltage VDH, the overload state determination unit 602 determines that the external power supply 10 is in an overload state (that is, a state that causes a decrease in the supply voltage Vrms as described above) due to certain circumstances and updates the overload state flag from OFF to ON in order to indicate this. In addition, after setting the overload state flag to ON, when the supply voltage Vrms is restored to the normal charging voltage VDH during execution of charging current control by the charging current control unit 604 to be described below, the overload state determination unit 602 determines that the external power supply 10 is no longer in the overload state and resets the overload state flag from ON to OFF in order to indicate this.

Immediately after the start of charging of the high-voltage battery 2, the charge stop determination unit 603 sets the charging stop request flag to OFF. During the charging of the high-voltage battery 2, when it is detected that the supply voltage Vrms has decreased to a level equal to or lower than a charging stop voltage Vth set to be lower than the above-described load decrease determination voltage VDL, the charge stop determination unit 603 determines that the external power supply 10 cannot continue charging and updates the charging stop request flag from OFF to ON in order to indicate this. Also, since the charging stop voltage Vth is set to be lower than the load decrease determination voltage VDL, when the charging stop request flag is ON, the above-described overload state flag is also always ON. Further, after setting the charging stop request flag to ON, when the supply voltage Vrms is restored to the normal charging voltage VDH while charging is turned off by the charging current control unit 604 to be described below, the charge stop determination unit 603 resets the charging stop request flag from ON to OFF in order to request restart of charging.

By referring to the overload state flag and the charging stop request flag described above, the charging current control unit 604 generates the charging on/off control signal S1 and the target value setting signal Isp having a level corresponding to a target value for the charging current, and inputs them to the driving circuit 208. More specifically, when the charging stop request flag is set to OFF, the charging current control unit 604 sets the charging on/off control signal S1 to ON in order to execute the charging of the high-voltage battery 2. Also, when the charging stop request flag is set to ON, the charging current control unit 604 sets the charging on/off control signal S1 to OFF in order to temporarily stop the charging of the high-voltage battery 2.

When both the overload state flag and the charging stop request flag are set to OFF, the charging current control unit 604 sets the target value setting signal Isp to a level corresponding to a predetermined rated charging current value Imax. When the charging stop request flag is set to OFF and the overload state flag is set to ON, as will be described in detail with reference to FIG. 3 below, the charging current control unit 604 executes charging current limiting control in which charging is executed by changing the target value setting signal Isp to be equal to or lower than the rated charging current value Imax described above. Also, when both the charging stop request flag and the overload state flag are set to ON, as will be described in detail with reference to FIG. 2 below, the charging current control unit 604 sets the target value setting signal Isp to zero over a certain period of time and then executes the charging current limiting control in which the charging is executed by changing the target value setting signal Isp to be equal to or lower than the rated charging current value Imax described above.

Next, a specific procedure of the charging current limiting control by the above-described charging current control unit 604 will be described with reference to FIGS. 2 and 3.

Figure 2:
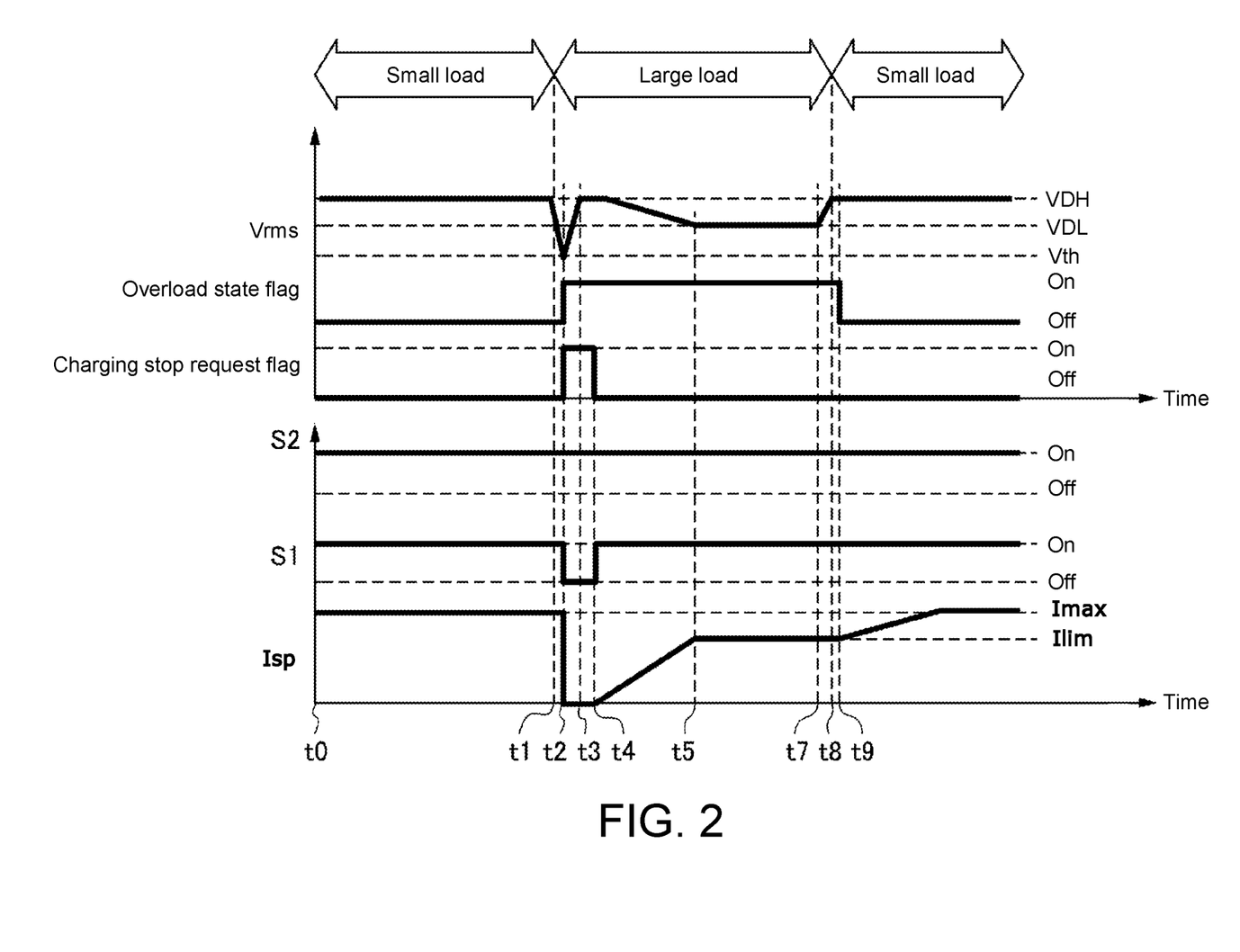
FIG. 2 is an example of a time chart for describing a procedure of charging current limiting control by a charging current control unit.

FIG. 2 is a first example of a time chart for describing a procedure of the charging current limiting control by the charging current control unit 604. In FIG. 2, temporal changes of the supply voltage Vrms, the overload state flag, the charging stop request flag, the charging request signal S2, the charging on/off control signal S1, and the target value setting signal Isp are illustrated in order from the top. Further, FIG. 2 illustrates a case in which the external power supply 10 is unstable due to certain circumstances during charging from the vicinity of time t1 to time t7 and the supply voltage Vrms decreases from the normal charging voltage VDH.

As illustrated in FIG. 2, in a period from time t0 to time t1, both the overload state flag and the charging stop request flag are set to OFF. Therefore, in the period from time t0 to t1, the charging current control unit 604 sets the target value setting signal Isp to a predetermined rated charging current value Imax and charges the high-voltage battery 2. At this time, since the external power supply 10 is in a stable state, the supply voltage Vrms is maintained substantially constant in the vicinity of the normal charging voltage VDH.

Thereafter, in the vicinity of time t1, the supply voltage Vrms starts to decrease from the vicinity of the normal charging voltage VDH in accordance with an unstable state of the external power supply 10 as described above. At time t1, the supply voltage Vrms becomes equal to or lower than the load decrease determination voltage VDL set to be lower than the normal charging voltage VDH, and at time t2 immediately thereafter, further becomes equal to or lower than the charging stop voltage Vth set to be lower than the load decrease determination voltage VDL.

The overload state determination unit 602 detects such a decrease in the supply voltage Vrms and updates the overload state flag from OFF to ON at time t1 in order to indicate that the external power supply 10 is in an overload state. In addition, the charge stop determination unit 603 detects such a decrease in the supply voltage Vrms, and updates the charging stop request flag from OFF to ON at time t2 in order to indicate that the external power supply 10 cannot continue charging.

In accordance with both the overload state flag and the charging stop request flag being set to ON substantially at the same time, the charging current control unit 604 executes the charging current limiting control for limiting the charging current to being equal to or lower than the above-described rated charging current value Imax according to a procedure described below. Further, the charging current control unit 604 executes this charging current limiting control until time t9 at which the overload state flag is reset to OFF.

In accordance with the charging stop request flag being set to ON at time t2, the charging current control unit 604 updates the charging on/off control signal S1 from ON to OFF in order to temporarily stop the charging and decreases the target value setting signal Isp from the rated charging current value Imax to zero. As a result, the charging current becomes zero. Also, in accordance with the charging current becoming zero, the supply voltage Vrms starts to rise and is restored to the normal charging voltage VDH at time t3. Thereafter, the charge stop determination unit 603 detects that the supply voltage Vrms has been restored to the normal charging voltage VDH at time t4 and accordingly resets the charging stop request flag from ON to OFF.

At time t4, the charging current control unit 604 resumes the charging in accordance with the charging stop request flag being reset to OFF as described above. More specifically, the charging current control unit 604 updates the charging on/off control signal S1 from OFF to ON and starts to increase the target value setting signal Isp from zero at a predetermined rate. Here, since the external power supply 10 is still in an unstable state at time t4, when the target value setting signal Isp is gradually increased from zero in this manner, the supply voltage Vrms starts to gradually decrease from the normal charging voltage VDH and reaches the load decrease determination voltage VDL at time t5.

The charging current control unit 604 monitors the supply voltage Vrms while gradually increasing the target value setting signal Isp from zero as described above, and maintains the target value setting signal Isp at a limit current value Ilim which is a value at which the supply voltage Vrms reaches the load decrease determination voltage VDL when the supply voltage Vrms reaches the load decrease determination voltage VDL at time t5. As a result, after time t5, since the charging current is maintained at the limit current value Ilim set in accordance with a state of the external power supply 10 which is in an unstable state, charging can be continued even when the external power supply 10 is in an unstable state.

Thereafter, in accordance with restoration of the external power supply 10 to a normal state, the supply voltage Vrms starts to rise from the load decrease determination voltage VDL at time t7, and the supply voltage Vrms is restored to the normal charging voltage VDH at time t8. While executing the charging current limiting control as described above, the overload state determination unit 602 detects that the supply voltage Vrms has been restored to the normal charging voltage VDH at time t9, and accordingly resets the overload state flag from ON to OFF in order to indicate that the external power supply 10 is no longer in the overload state.

In accordance with the overload state flag being reset from ON to OFF at time t9, the charging current control unit 604 ends the charging current limiting control for limiting the charging current to the above-described limit current value Ilim. More specifically, after time t9, the charging current control unit 604 gradually increases the target value setting signal Isp from the limit current value Ilim toward the rated charging current value Imax.

Figure 3:
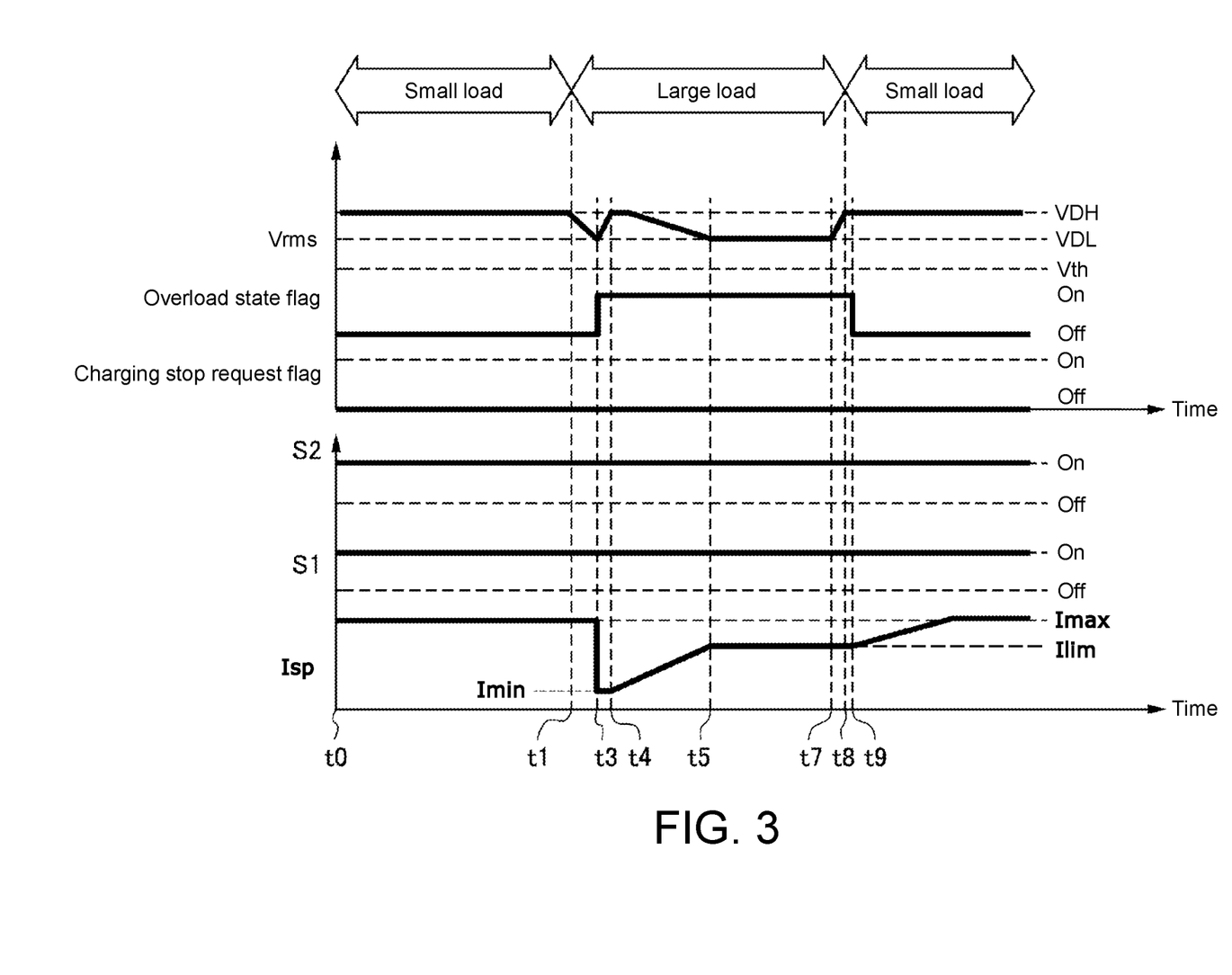
FIG. 3 is an example of a time chart for describing a procedure of charging current limiting control by a charging current control unit.

FIG. 3 is a second example of a time chart for describing a procedure of the charging current limiting control by the charging current control unit 604. In FIG. 3, temporal changes of the supply voltage Vrms, the overload state flag, the charging stop request flag, the charging request signal S2, the charging on/off control signal S1, and the target value setting signal Isp are illustrated in order from the top. Further, FIG. 3 illustrates a case in which the external power supply 10 is unstable due to certain circumstances during charging from the vicinity of time t1 to time t7 and the supply voltage Vrms decreases from the normal charging voltage VDH. In addition, FIG. 3 illustrates a case in which the supply voltage Vrms gently decreases as compared with the example of FIG. 2 described above.

In FIG. 3, since events occurring from time t0 to time t1 are the same as those in FIG. 2, description thereof will be omitted.

Thereafter, in the vicinity of time t1, the supply voltage Vrms starts to decrease from the vicinity of the normal charging voltage VDH in accordance with the unstable state of the external power supply 10 as described above. The supply voltage Vrms decreases more gently than that in the example of FIG. 2 and becomes equal to or lower than the load decrease determination voltage VDL at time t3.

The overload state determination unit 602 detects such a decrease in the supply voltage Vrms and updates the overload state flag from OFF to ON at time t3 in order to indicate that the external power supply 10 is in an overload state.

In accordance with the overload state flag being set to ON, the charging current control unit 604 executes the charging current limiting control for limiting the charging current to being equal to or lower than the above-described rated charging current value Imax according to a procedure described below. The charging current control unit 604 executes this charging current limiting control until time t9 at which the overload state flag is reset to OFF.

In accordance with the overload state flag being set to ON at time t3, the charging current control unit 604 decreases the target value setting signal Isp from the rated charging current value Imax to a predetermined lower limit current value Imin. Here, the lower limit current value Imin is set to a value slightly larger than zero. As a result, the charging current is decreased to the lower limit current value Imin. Also, in accordance with the charging current being decreased to the lower limit current value Imin, the supply voltage Vrms begins to rise and is restored to the normal charging voltage VDH at time t4.

In accordance with the supply voltage Vrms being restored to the normal charging voltage VDH at time t4, the charging current control unit 604 starts to increase the target value setting signal Isp from the lower limit current value Imin at a predetermined rate. Here, since the external power supply 10 is still in an unstable state even at time t4, when the target value setting signal Isp is gradually increased from the lower limit current value Imin in this manner, the supply voltage Vrms starts to gradually decrease from the normal charging voltage VDH and reaches the load decrease determination voltage VDL at time t5.

The charging current control unit 604 monitors the supply voltage Vrms while gradually increasing the target value setting signal Isp from the lower limit current value Imin as described above, and maintains the target value setting signal Isp at the limit current value Ilim which is a value at which the supply voltage Vrms reaches the load decrease determination voltage VDL when the supply voltage Vrms reaches the load decrease determination voltage VDL at time t5. As a result, after time t5, since the charging current is maintained at the limit current value Ilim set in accordance with the state of the external power supply 10 which is in an unstable state, charging can be continued even when the external power supply 10 is in an unstable state.

Thereafter, in accordance with restoration of the external power supply 10 to a normal state, the supply voltage Vrms starts to rise from the load decrease determination voltage VDL at time t7, and the supply voltage Vrms is restored to the normal charging voltage VDH at time t8. While executing the charging current limiting control as described above, the overload state determination unit 602 detects that the supply voltage Vrms has been restored to the normal charging voltage VDH at time t9, and accordingly resets the overload state flag from ON to OFF in order to indicate that the external power supply 10 is no longer in the overload state.

In accordance with the overload state flag being reset from ON to OFF at time t9, the charging current control unit 604 ends the charging current limiting control for limiting the charging current to the above-described limit current value Ilim. More specifically, after time t9, the charging current control unit 604 gradually increases the target value setting signal Isp from the limit current value Ilim toward the rated charging current value Imax.

According to the charging control device 1 of the present embodiment as described above, the following effects are achieved.

(1) The supply voltage sensor 205 detects the supply voltage Vrms from the external power supply 10 to the high-voltage battery 2, and the supply voltage monitoring unit 601 detects or predicts presence or absence of a decrease in the supply voltage Vrms from the normal charging voltage VDH during charging and updates the overload state flag and the charging stop request flag in accordance with the detection result. When the decrease in the supply voltage Vrms is not detected or predicted, the charging current control unit 604 sets the target value setting signal Isp for the charging current to a predetermined rated charging current value Imax, and the driving circuit 208 and the charging current adjusting circuit 207 adjust the charging current to be a value in accordance with the target value setting signal Isp. Also, when the decrease in the supply voltage Vrms is detected or predicted, the charging current control unit 604 changes the target value setting signal Isp to be equal to or lower than the rated charging current value Imax, and then maintains the target value setting signal Isp at the limit current value Ilim which is a value at which the supply voltage Vrms reaches the load decrease determination voltage VDL which is lower than the normal charging voltage VDH. Then, the driving circuit 208 and the charging current adjusting circuit 207 adjust the charging current in accordance with the change of the target value setting signal Isp as described above. That is, in the charging control device 1, when the external power supply 10 is unstable for certain reasons during charging and the supply voltage Vrms decreases from the normal charging voltage VDH, the charging current is decreased to the rated charging current value Imax or lower so that the supply voltage Vrms is maintained at the load decrease determination voltage VDL which is lower than the normal charging voltage VDH. Therefore, according to the charging control device 1, even when the external power supply 10 is unstable and the supply voltage Vrms decreases from the normal charging voltage VDH, frequent repetition of interruption of charging can be avoided even when the external power supply 10 is unstable by decreasing the charging current to an appropriate level according to a state of the external power supply 10.

(2) As described with reference to FIG. 3, when it is detected that the supply voltage Vrms has decreased to the load decrease determination voltage VDL or lower, when a rapid decrease in the supply voltage Vrms is detected, or when it is predicted that the supply voltage Vrms will rapidly decrease from the normal charging voltage VDH, the overload state determination unit 602 determines that the external power supply 10 is in an overload state and sets the overload state flag to ON. When the overload state flag is set to ON, the charging current control unit 604 decreases the target value setting signal Isp to the predetermined lower limit current value Imin, and thereafter, gradually increases the target value setting signal Isp from the lower limit current value Imin until the supply voltage Vrms reaches the load decrease determination voltage VDL, and then maintains the target value setting signal Isp at the limit current value Ilim which is the value at which the supply voltage Vrms reaches the load decrease determination voltage VDL. Therefore, according to the charging control device 1, even when the external power supply 10 is in an unstable state, it is possible to set a maximum possible target value within a range in which supply is possible.

(3) As described with reference to FIG. 2, when it is detected that the supply voltage Vrms has decreased to a level equal to or lower than the charging stop voltage Vth, which is even lower than the load decrease determination voltage VDL, the charge stop determination unit 603 determines that the external power supply 10 is in a charge disabled state and sets the charging stop request flag to ON. Further, when the charging stop request flag is set to ON, the charging current control unit 604 continues to set the target value to zero until the supply voltage Vrms reaches the normal charging voltage VDH. That is, the target value setting signal Isp is set to zero, and the charging is temporarily stopped. Thereafter, the charging current control unit 604 gradually increases the target value setting signal Isp from zero, and maintains the target value setting signal Isp at the limit current value Ilim which is the value at which the supply voltage Vrms reaches the load decrease determination voltage VDL. Therefore, according to the charging control device 1, after temporary stopping of the charging in accordance with the external power supply 10 being brought into the charge disabled state, the charging can be resumed by decreasing the charging current to an appropriate level in accordance with the state of the external power supply 10. Further, by resuming the charging by decreasing the charging current to an appropriate level in accordance with the state of the external power supply 10 as described above, when an unstable state of the external power supply 10 continues even thereafter, since the supply voltage Vrms can be prevented from decreasing to the charging stop voltage Vth or lower, frequent repetition of interruption of charging can be avoided. Further, according to the charging control device 1, even when the external power supply 10 is in an unstable state, it is possible to set a maximum possible target value within a range in which supply is possible.

Figure 4:
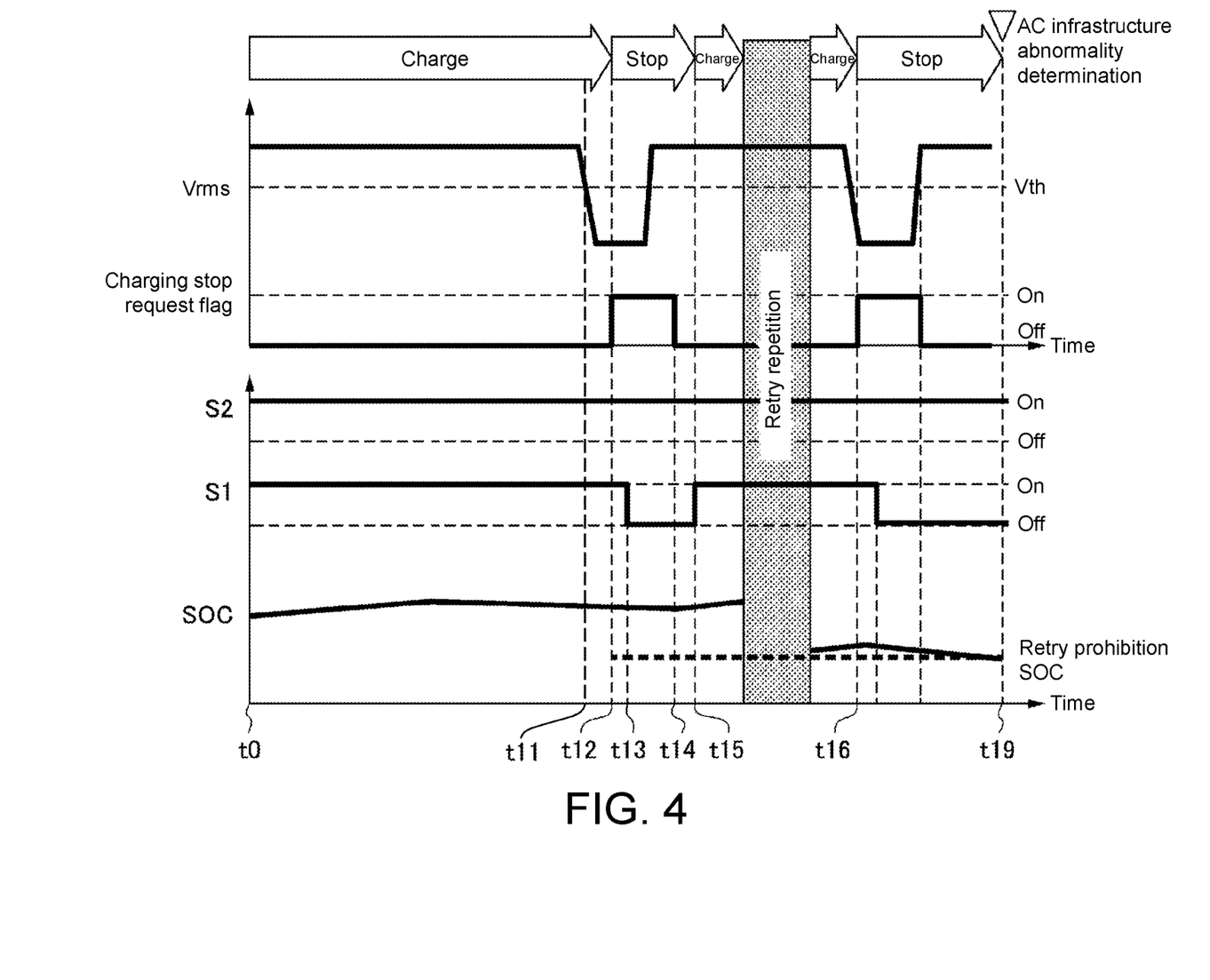
FIG. 4 is a time chart for describing a charging control technology related to the disclosure.

FIG. 4 is a time chart for describing a charging control technology related to the disclosure. In FIG. 4, temporal changes of the supply voltage Vrms, the charging stop request flag, the charging request signal S2, the charging on/off control signal S1, and the SOC of the high-voltage battery 2 are illustrated in order from the top. A circuit configuration for realizing the charging control technology in FIG. 4 is substantially the same as the circuit in FIG. 1. Therefore, corresponding control signals and the like are denoted by the same reference signs as in FIGS. 2 and 3 which are timing diagrams of the circuit of FIG. 1. Further, a charging control technology described below with reference to FIG. 4 is a technology which determines that the external power supply 10 itself is abnormal when a state in which the supply voltage Vrms decreases to the charging stop voltage Vth or lower occurs frequently, and stops charging in order to prevent the SOC of the high-voltage battery 2 from decreasing.

In the example of FIG. 4, for example, in accordance with the supply voltage Vrms becoming equal to or lower than the charging stop voltage Vth at time t11, the charge stop determination unit 603 updates the charging stop request flag from OFF to ON at time t12. In accordance with this, the charging current control unit 604 updates the charging on/off control signal S1 from ON to OFF at time t13, and temporarily stops the charging. Thereafter, in accordance with the temporary stop of the charging, the supply voltage Vrms is restored. In accordance with the restoration of the supply voltage Vrms, the charge stop determination unit 603 resets the charging stop request flag from ON to OFF at time t14, thereafter the charging current control unit 604 resets the charging on/off control signal S1 from OFF to ON at time t15, and then the charging current limiting control is executed as described with reference to FIGS. 2 and 3.

FIG. 4 illustrates a case in which the supply voltage Vrms fluctuates up and down across the charging stop voltage Vth due to an extremely unstable external power supply 10. That is, a case in which retrying of charging, which causes a decrease in the supply voltage Vrms again when charging is temporarily stopped and then resumed as described above, is repeated until time t16 is illustrated.

As illustrated in FIG. 4, when such a retrying of charging is repeatedly performed, the SOC of the high-voltage battery 2 may gradually decrease. Therefore, the charging ECU 60 monitors the SOC of the high-voltage battery 2 while the retrying of charging is repeated. In this SOC, a retry prohibition SOC level for determining that SOC recovery is difficult due to abnormality of the external power supply 10 itself is set. When the SOC of the high-voltage battery 2 decreases to the retry prohibition SOC level or lower at time t19, the charging ECU 60 determines that the external power supply 10 is in an extremely unstable state, and prohibits subsequent retrying of charging in order to prevent further decrease in the SOC of the high-voltage battery 2.

Figure 5:
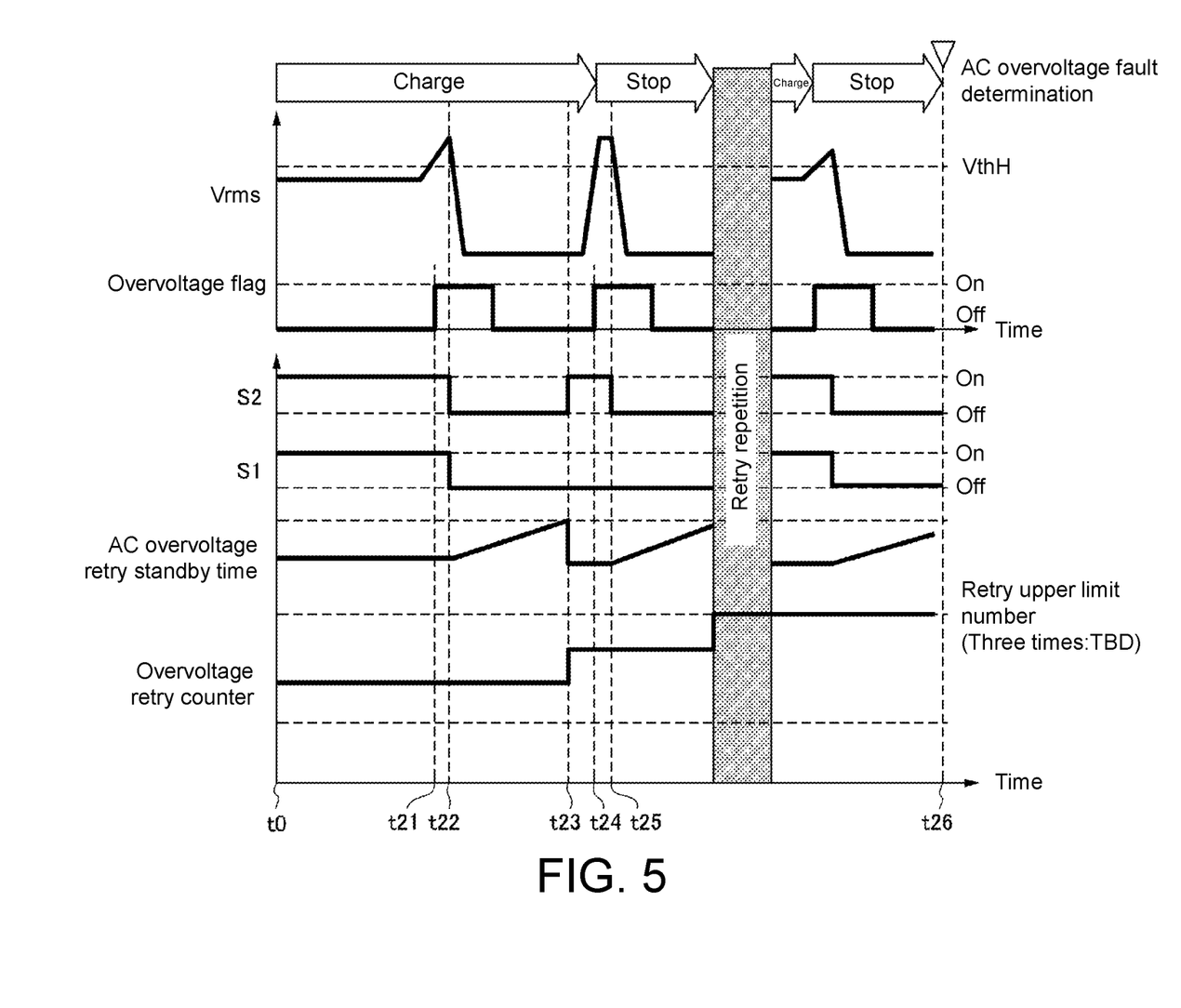
FIG. 5 is a time chart for describing a charging control technology related to the disclosure.

FIG. 5 is a time chart for describing a charging control technology related to the disclosure. In FIG. 5, temporal changes of the supply voltage Vrms, an overvoltage flag, the charging request signal S2, the charging on/off control signal S1, an AC overvoltage retry standby time, and an overvoltage retry counter are illustrated in order from the top. A circuit configuration for realizing the charging control technology in FIG. 5 is substantially the same as the circuit in FIG. 1. Therefore, corresponding control signals and the like are denoted by the same reference signs as those in FIGS. 2 to 4 which are timing diagrams of the circuit of FIG. 1. Further, a charging control technology described below with reference to FIG. 5 is a technology which determines that the external power supply 10 itself is generating an overvoltage fault when a state in which the supply voltage Vrms exceeds a predetermined high-voltage threshold value VthH occurs frequently, and stops charging to protect the on-board charger 200.

In the example of FIG. 5, for example, the supply voltage Vrms exceeds the high-voltage threshold value VthH at time t21. In accordance with this, the charge stop determination unit 603 updates the overvoltage flag indicating that the external power supply 10 is in an overvoltage state from OFF to ON. Thereafter, at time t22, the charge stop determination unit 603 updates both the charging on/off control signal S1 and the charging request signal S2 from ON to OFF to stop the charging and stops power supply from the external power supply 10 to the on-board charger 200 itself. As described above, when the charging request signal S2 is set to OFF, the supply voltage Vrms quickly decreases to zero, thereby preventing an overvoltage from being applied to the on-board charger 200.

At time t22, the charge stop determination unit 603 stops supply of power from the external power supply 10 as described above and starts measuring the AC overvoltage retry standby time. The AC overvoltage retry standby time is for measuring a standby time until supply of power from the external power supply 10 to the on-board charger 200 is resumed after temporarily stopping the supply of power from the external power supply 10 to the on-board charger 200 due to an overvoltage of the external power supply 10.

Thereafter, at time t23, in accordance with the AC overvoltage retry standby time reaching a predetermined time, the charge stop determination unit 603 updates the charging request signal S2 from OFF to ON to determine whether or not an overvoltage condition of the external power supply 10 has been eliminated. Thereby, supply of power from the external power supply 10 to the on-board charger 200 is resumed. At this time, the charge stop determination unit 603 resets the AC overvoltage retry standby time and counts up the overvoltage retry counter from zero to one. This overvoltage retry counter counts the number of times supply of power from the external power supply 10 to the on-board charger 200 is resumed.

In the example of FIG. 5, the overvoltage condition of the external power supply 10 is still not eliminated even after time t23. Therefore, after time t23, the supply voltage Vrms rises again and exceeds the high-voltage threshold value VthH again at time t24. In accordance with this, the charge stop determination unit 603 updates the overvoltage flag from OFF to ON again at time t24. Thereafter, the charge stop determination unit 603 updates the charging request signal S2 from ON to OFF at time t25 to stop supply of power from the external power supply 10 to the on-board charger 200 again and to start measuring the AC overvoltage retry standby time.

FIG. 5 illustrates a case in which retrying of charging, in which stopping and resuming of supply of power from the external power supply 10 to the on-board charger 200 due to the overvoltage condition of the external power supply 10 continuing is repeated, is repeatedly performed until time t26.

As illustrated in FIG. 5, when such retrying of charging is repeatedly performed, an excessive voltage from the external power supply 10 is frequently applied to the on-board charger 200. In the on-board charger 200, as illustrated in FIG. 1, the EMI filter 203 is provided at the position closest to the external power supply 10. Further, since a capacitor is mounted on the EMI filter 203, an excessive inrush current flows into the capacitor every time such retrying of charging is performed. Therefore, in order to prevent failure of the EMI filter 203, the charge stop determination unit 603 limits the number of times of retrying of charging in one charging cycle. That is, when a value of the overvoltage retry counter reaches a predetermined value (for example, three), the charge stop determination unit 603 maintains the charging request signal S2 in the OFF state in order to prevent failure of the EMI filter 203.

Although one embodiment of the disclosure has been described above, the disclosure is not limited to this. The configuration of the details may be appropriately changed within the scope of the gist of the disclosure. For example, although in the above-described embodiment, a configuration having the charging system for charging the high-voltage battery 2 and/or the low voltage battery 3, which are storage batteries mounted on the vehicle V, from the external power supply 10 such as commercial AC power supply for home use or the like has been described, it is also possible to employ a configuration including a system for charging the batteries from an external DC power supply in addition to such a charging system described above.

What is claimed is:

1. A charging control device which controls charging of a storage battery with an external power supply, the charging control device comprising:
   a target value setting portion, setting a target value of a charging current from the external power supply to the storage battery;
   a charging current adjusting portion, adjusting the charging current to the set target value;
   a supply voltage detecting portion, detecting a supply voltage from the external power supply to the storage battery; and
   a voltage monitoring portion, detecting or predicting presence or absence of a decrease in the supply voltage from a predetermined normal charging voltage using an output of the supply voltage detecting portion,
   wherein the target value setting portion sets the target value to a predetermined normal target value when the decrease in the supply voltage is not detected or predicted by the voltage monitoring portion, and changes the target value to be equal to or lower than the normal target value and maintains the target value at a value at which the supply voltage reaches a determination voltage lower than the normal charging voltage when the decrease in the supply voltage is detected or predicted by the voltage monitoring portion.

2. The charging control device according to claim 1, wherein when the voltage monitoring portion detects that the supply voltage has decreased to the determination voltage or lower, detects a rapid decrease in the supply voltage, or predicts that the supply voltage rapidly decreases from the normal charging voltage, the target value setting portion decreases the target value to a predetermined lower limit value, gradually increases the target value from the lower limit value until the supply voltage reaches the determination voltage, and maintains the target value at a value at which the supply voltage reaches the determination voltage.

3. The charging control device according to claim 1, wherein when the voltage monitoring portion detects that the supply voltage has decreased to a level equal to or lower than a charging stop voltage which is lower than the determination voltage, the target value setting portion continues to set the target value to zero until the supply voltage reaches the normal charging voltage, gradually increases the target value from zero, and maintains the target value at a value at which the supply voltage reaches the determination voltage.

4. The charging control device according to claim 2, wherein when the voltage monitoring portion detects that the supply voltage has decreased to a level equal to or lower than a charging stop voltage which is lower than the determination voltage, the target value setting portion continues to set the target value to zero until the supply voltage reaches the normal charging voltage, gradually increases the target value from zero, and maintains the target value at a value at which the supply voltage reaches the determination voltage.

* * * * *